United States Patent
Kobayashi et al.

(10) Patent No.: US 10,286,500 B2
(45) Date of Patent: *May 14, 2019

(54) BUILD-UP WELDING MATERIAL AND MACHINERY PART WELDED WITH WELD OVERLAY METAL

(71) Applicant: Kobe Steel, Ltd., Kobe-shi (JP)

(72) Inventors: Ryuichi Kobayashi, Takasago (JP); Tsutomu Takeda, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 662 days.

This patent is subject to a terminal disclaimer.

(21) Appl. No.: 14/363,951

(22) PCT Filed: Dec. 7, 2012

(86) PCT No.: PCT/JP2012/007854
§ 371 (c)(1),
(2) Date: Jun. 9, 2014

(87) PCT Pub. No.: WO2013/114501
PCT Pub. Date: Aug. 8, 2013

(65) Prior Publication Data
US 2014/0322560 A1    Oct. 30, 2014

(30) Foreign Application Priority Data

Jan. 31, 2012    (JP) ................... 2012-018874

(51) Int. Cl.
*B32B 15/01*    (2006.01)
*C22C 38/22*    (2006.01)
(Continued)

(52) U.S. Cl.
CPC ........ *B23K 35/3086* (2013.01); *B32B 15/011* (2013.01); *C22C 38/22* (2013.01);
(Continued)

(58) Field of Classification Search
USPC ..................................... 428/685; 420/34–71
See application file for complete search history.

(56) References Cited

U.S. PATENT DOCUMENTS 3,719,790 A * 3/1973 Plockinger et al. ............ 219/73
5,601,411 A    2/1997 Usami et al.
6,331,688 B1 * 12/2001 Hallen ............... B23K 35/0255
219/136

FOREIGN PATENT DOCUMENTS

DE    4104832    * 8/1992 ............ C10B 25/02
JP    59-225805    12/1984
(Continued)

OTHER PUBLICATIONS

English machine translation of Sato (JP 2010-196108), JPO, accessed Jun. 5, 2015.*

(Continued)

*Primary Examiner* — Humera N Sheikh
*Assistant Examiner* — Xiaobei Wang
(74) *Attorney, Agent, or Firm* — Oblon, McClelland, Maier & Neustadt, L.L.P.

(57) ABSTRACT

Disclosed is a build-up welding material and a machinery part welded with a weld overlay metal. The build-up welding material contains C of 0.2 to 1.0 percent by mass, Si of 0.2 to 0.5 percent by mass, Mn of 0.5 to 2.0 percent by mass, Cr of 15 to 30 percent by mass, Mo of 0.2 to 6.0 percent by mass, and W of 0.1 to 1.5 percent by mass, with the remainder including Fe and inevitable impurities.

11 Claims, 7 Drawing Sheets

(51) Int. Cl.
*C22C 38/24* (2006.01)
*C22C 38/44* (2006.01)
*B23K 35/30* (2006.01)
*C22C 38/58* (2006.01)
*C21D 6/00* (2006.01)
*C21D 9/50* (2006.01)

(52) U.S. Cl.
CPC .............. *C22C 38/24* (2013.01); *C22C 38/44* (2013.01); *C22C 38/58* (2013.01); *C21D 6/002* (2013.01); *C21D 9/50* (2013.01); *Y10T 428/12965* (2015.01)

(56) References Cited

FOREIGN PATENT DOCUMENTS

| | | | | |
|---|---|---|---|---|
| JP | S61-283489 | * | 12/1986 | ........... B23K 35/308 |
| JP | 7-116780 | | 5/1995 | |
| JP | 8-1375 | | 1/1996 | |
| JP | 11-226778 A | | 8/1999 | |
| JP | 11-266778 | | 10/1999 | |
| JP | 2002-371341 A | | 12/2002 | |
| JP | 2010-196108 | | 9/2010 | |
| WO | 2012/042861 | | 4/2012 | |

OTHER PUBLICATIONS

English machine translation of JPS61-283489, JPO, accessed Feb. 6, 2016.*
International Search Report dated Feb. 26, 2013 in PCT/JP12/007854 filed Dec. 7, 2012.
Written Opinion of the International Searching Authority dated Feb. 26, 2013 in PCT/JP12/007854 filed Dec. 7, 2012.
Extended European Search Report dated Feb. 22, 2016 in Patent Application No. 12867598.0.

* cited by examiner

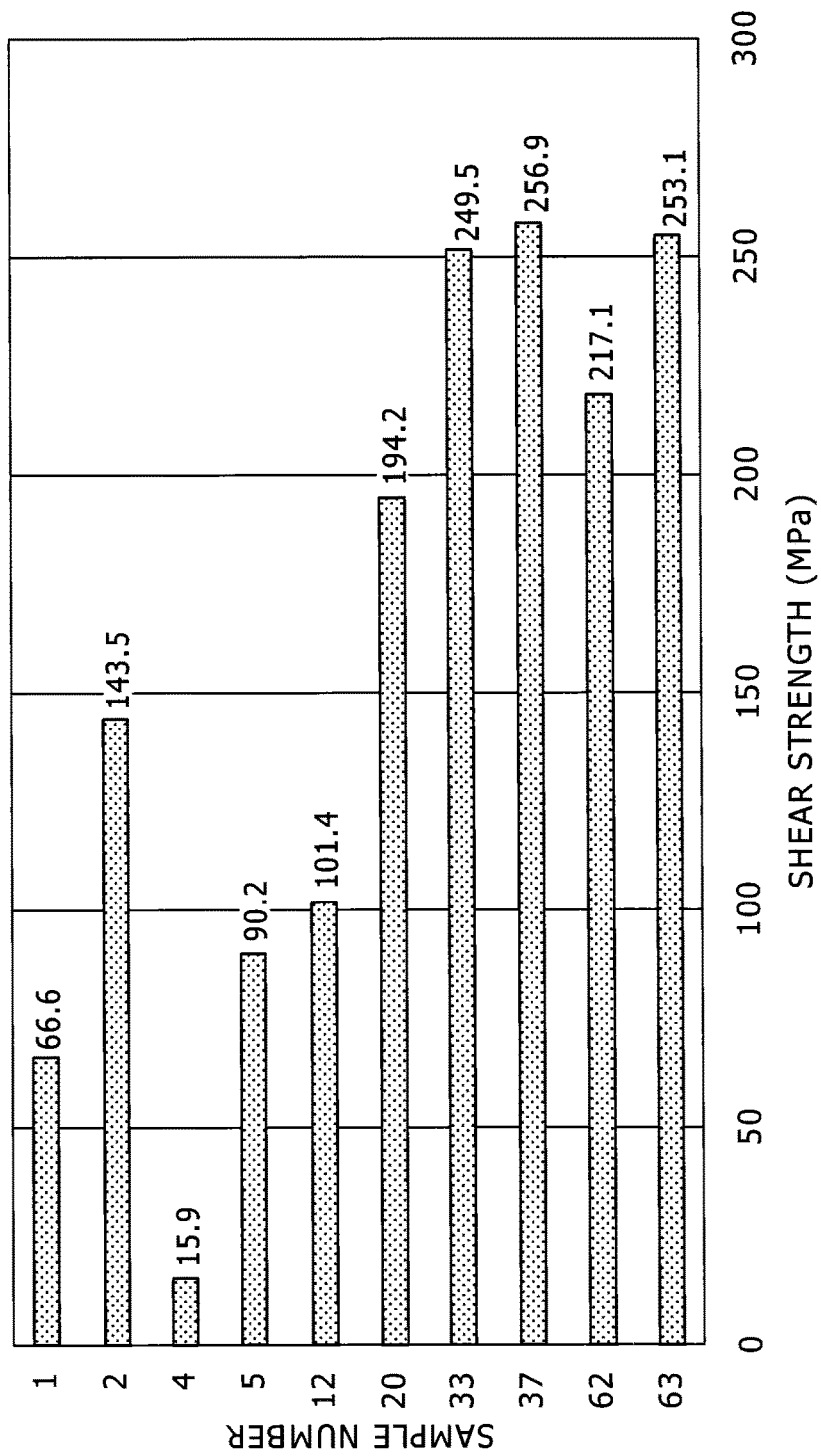

BUILD-UP WELDING MATERIAL AND MACHINERY PART WELDED WITH WELD OVERLAY METAL

TECHNICAL FIELD

The present invention relates to build-up welding materials and machinery parts welded with weld overlay metals. More specifically, the present invention relates to a build-up welding material and a machinery part (machine component) both of which are advantageously usable in applications requiring excellent corrosion resistance and abrasion resistance, such as pulverizers for articles excavated from acidic soil; and tube reactors.

BACKGROUND ART

A treatment object (material) to be treated in treatment equipment such as pulverizer or tube reactor may contain an acid such as hydrochloric acid or sulfuric acid or may secondarily form such an acid during a treatment. A treatment chamber of the treatment equipment to house the treatment object is generally shaped from a steel. The acid, if present, may disadvantageously corrode the inner wall of the treatment chamber. In addition, the treatment object may often disadvantageously abrade the treatment chamber inner wall during the treatment. To prevent the disadvantages, build-up welding materials for use in machinery parts such as treatment chambers require corrosion resistance and abrasion resistance.

Fe alloys and Co alloys having chemical compositions as given in Table 1 have been used as build-up welding materials. Different build-up welding materials are used depending on the types of the treatment equipment and the treatment object.

TABLE 1

| | Alloy chemical composition (in mass percent) | | | | | | | | | | |
|---|---|---|---|---|---|---|---|---|---|---|---|
| | C | Si | Mn | Cr | Mo | Ni | V | W | Co | Fe | Remarks |
| No. 1 | 0.7 | 0.9 | 1.2 | 12.0 | 3.8 | 0.7 | 2.0 | 0.9 | — | Bal. | Conventional Example |
| No. 2 | 0.4 | 0.2 | 0.7 | 13.5 | 0.3 | — | — | — | — | Bal. | Conventional Example |
| No. 3 | 2.5 | — | — | 33.0 | — | — | — | 13.0 | Bal. | — | Conventional Example |
| No. 4 | 1.0 | — | — | 26.0 | — | — | — | 5.0 | Bal. | — | Conventional Example |
| No. 5 | 0.4 | 0.2 | 0.6 | 13.0 | 0.3 | — | — | — | — | Bal. | Conventional Example |
| No. 6 | 4.5 | 0.7 | 1.1 | 31.0 | 1.6 | — | — | — | — | Bal. | Conventional Example |

All the conventional build-up welding materials, however, fail to have sufficient performance in corrosion resistance and abrasion resistance. The build-up welding materials have inferior ductility and toughness. The build-up welding materials therefore disadvantageously cause a weld overlay layer after welding to be susceptible to cracking. As a result, the build-up welding materials have inferior welding workability and often cause the weld overlay layer after welding to suffer from micro-cracks and/or coarse cracks.

Such an imperfection in welding, if generated, requires repair at that location (the location where the imperfection is generated). Specifically, a crack, if generated in the weld overlay layer, should be filled by welding of a welding material (build-up welding material) having the same chemical composition as with the weld overlay layer. The conventional build-up welding materials are, however, unsuitable for such repair. For this reason, when another overlay welding is performed on an existing weld overlay layer, the existing weld overlay layer suffers from generation of a multiplicity of cracks and fails to be sufficiently repaired.

Independently, there have been widely used treatment chambers including a weld overlay layer and, on a surface thereof, a hard chrome coated layer (having a thickness of 10 to 200 μm) so as to provide better abrasion resistance. The weld overlay metals formed from the conventional build-up welding materials, however, have poor adhesion with a hard chrome coating and fail to be covered by the hard chrome coating stably. The weld overlay metals also have inferior ductility and toughness. The weld overlay metals therefore often cause cracks in the hard chrome coated layer and/or weld overlay layer after welding.

Under such circumstances, build-up welding materials have been proposed so as to provide better corrosion resistance and abrasion resistance (see Patent Literature (PTL) 1). PTL 1 discloses a build-up welding material for use in a member that requires excellent strength, oxidation resistance, and abrasion resistance at a high temperature of 600° C. or higher. The build-up welding material contains 0.5 to 3.0 percent by weight of C, 3.0 to 7.0 percent by weight of Si, 25 to 45 percent by weight of Cr, 0 to 10 percent by weight of Mn, and 0 to 13 percent by weight of Ni, with the remainder including Fe and inevitable impurities, in which the Cr and Si contents meet a condition as specified by Cr≥−1.6Si+37. The build-up welding material forms a weld overlay metal on a base metal, where the weld overlay metal is strengthened or reinforced by fine acicular carbides in the form of short fibers.

The build-up welding material disclosed in PTL 1 employs a steel (Fe alloy). The build-up welding material contains C, Si, and Cu in high contents and contains transition elements of Groups IVa to Va (Ti, V, Zr, Nb, Mo, and Ta) in large amounts. The build-up welding material exhibits poor fracture toughness because of having a high C content of 0.5 to 3.0 percent by weight and has an excessively high hardness because of containing the transition elements of Groups IVa to Va (Ti, Zr, Nb, and Ta) in large amounts. The build-up welding material is therefore susceptible to brittle fracture by corrosion.

The build-up welding material disclosed in PTL 1 is also susceptible to red scaling (red-scale defects) after hot rolling because of having an extremely high Si content of 3.0 to 7.0 percent by weight, where the hot rolling is performed as a steel production process. The red scaling, even if removed by acid wash, may leave large surface asperities to cause surface unevenness of the product. The red scaling may possibly occur even at a high temperature of 600° C. or higher. In this case, powder of $\alpha\text{-Fe}_2\text{O}_3$ mainly forming the red scaling migrates into the treatment object.

In addition, the build-up welding material disclosed in PTL 1 is susceptible to hot shortness (red shortness) during hot rolling process because of having an extremely high Cu content of 7.0 percent by weight in terms of its upper limit, where the hot rolling process is performed as a steel production process. This impedes the manufacturing of the steel by a common steel manufacturing method including the hot rolling process and impedes the manufacturing and supply of the target build-up welding material.

Independently, other Fe alloys have been proposed as build-up welding materials so as to provide better corrosion resistance and abrasion resistance. Specifically, there has been proposed a build-up welding material that contains 0.2 to 1.5 percent by mass of C, 0.5 to 2.0 percent by mass of Si, 0.5 to 2.0 percent by mass of Mn, 20 to 40 percent by mass of Cr, 2.0 to 6.0 percent by mass of Mo, 0.5 to 6.0 percent by mass of Ni, 1.0 to 5.0 percent by mass of V, and 0.5 to 5.0 percent by mass of W, with the remainder including Fe and inevitable impurities. The weld overlay metal includes a ferrite phase matrix and has a polycrystalline microstructure in which cementite particles are present at grain boundaries of grains of the ferrite matrix and surround the ferrite grains. The build-up welding material excels in corrosion resistance and abrasion resistance, but has room for improvements in ductility and toughness. The build-up welding material also has room for improvement in welding workability and weld repairability. Particularly, the build-up welding material, when used for another weld overlaying to repair an existing weld overlay layer, may cause cracking in the existing weld overlay layer in some weld overlaying range and may require a complicated repairing procedure. In addition, the build-up welding material has insufficient adhesion with a hard chrome coating, and this may impede the stable formation of the coating.

CITATION LIST

Patent Literature

PTL 1: Japanese Unexamined Patent Application Publication (JP-A) No. H11(1999)-226778

SUMMARY OF INVENTION

The present invention has been made in consideration of disadvantages of conventional technologies, and an object thereof is to provide a welding material to form a weld overlay metal for use in an environment where the weld overlay metal is often exposed to an acid that causes corrosion. The weld overlay metal given by the build-up welding material excels in corrosion resistance and abrasion resistance, has satisfactory ductility and toughness, exhibits excellent welding workability and weld repairability, has good adhesion with a hard chrome coating, and less suffers from cracking. Another object of the present invention is to provide a machinery part welded with such weld overlay metal.

The present invention provides, in an aspect, a build-up welding material containing C in a content of 0.2 to 1.0 percent by mass, Si in a content of 0.2 to 0.5 percent by mass, Mn in a content of 0.5 to 2.0 percent by mass, Cr in a content of 15 to 30 percent by mass, Mo in a content of 0.2 to 6.0 percent by mass, and W in a content of 0.1 to 1.5 percent by mass, with the remainder including Fe and inevitable impurities.

The present invention further provides, in another aspect, a machinery part including a base steel and a weld overlay metal welded on or over a surface of the base steel, in which the weld overlay metal has a surface layer and contains C in a content of 0.2 to 1.0 percent by mass, Si in a content of 0.2 to 0.5 percent by mass, Mn in a content of 0.5 to 2.0 percent by mass, Cr in a content of 15 to 30 percent by mass, Mo in a content of 0.2 to 6.0 percent by mass, and W in a content of 0.1 to 1.5 percent by mass in a chemical composition in the surface layer, and the weld overlay metal further contains Fe and inevitable impurities in the surface layer.

These and other objects, features, and advantages of the present invention will be more apparent from the following detailed description with reference to the attached drawings.

BRIEF DESCRIPTION OF DRAWINGS

FIG. 7 is a graph illustrating results of the plane shear tests in Experimental Example 9.

DESCRIPTION OF EMBODIMENTS

Figure 1:
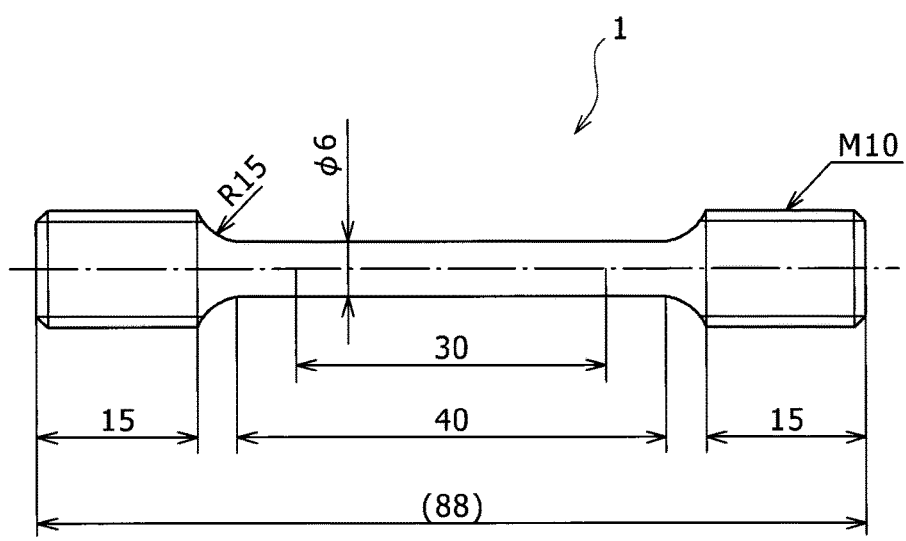
FIG. 1 is an explanatory drawing illustrating a non-proportional test specimen (Gleeble test specimen) prepared for tensile tests in Experimental Example 2 in the present invention.

The present invention will be illustrated in detail with reference to embodiments thereof below. In an embodiment, the present invention provides a welding material (build-up welding material) to form a weld overlay metal and is advantageously usable in a treatment chamber for treating a treatment object. The object to be treated in the treatment chamber may contain an acid such as hydrochloric acid or sulfuric acid. The treatment chamber may therefore be used in an acidic corrosive environment of pH 7 to about pH 4.2. The treatment chamber may also be arranged in treatment equipment such as a pulverizer or tube reactor and be used in a temperature range of room temperature to about 200° C.

The build-up welding material according to the embodiment of the present invention, when used to form a weld overlay metal on or over an inner wall of the treatment chamber, can help the treatment chamber to have better corrosion resistance and abrasion resistance. The build-up welding material can thereby help the treatment chamber to have a longer life. The build-up welding material also excels in welding workability and repairability. In addition, the build-up welding material gives a weld overlay layer by welding, on which surface a hard chrome coated layer can be satisfactorily formed so as to provide better abrasion resistance.

A chemical composition of the build-up welding material according to the embodiment will be illustrated below.

Carbon (C) helps the weld overlay metal to keep balance between tensile strength and elongation. The C content in the welding material (build-up welding material) is 0.2 to 1.0 percent by mass, and more preferably 0.3 to 0.8 percent by mass. With an increasing C content, steels (Fe alloys) have a higher tensile strength and better abrasion resistance, but exhibit lower toughness. Particularly, a hyper-eutectoid steel having a C content of greater than 1.0 percent by mass has remarkably inferior toughness and is hardly worked. To prevent this and to give good balance in properties as a weld overlay metal, the C content in the build-up welding material is preferably 0.2 to 1.0 percent by mass while ensuring abrasion resistance by the addition of one or more other elements.

Silicon (Si) helps the weld overlay metal to have a higher tensile strength. To exhibit the activity, the Si content in the welding material is specified to be 0.2 percent by mass or more. In contrast, Si, if contained in an excessively high content, may make a steel (Fe alloy) significantly brittle. To prevent this, the Si content is preferably 0.2 to 0.5 percent by mass.

Manganese (Mn) helps the welding material to give a weld overlay metal having a strength and toughness at certain levels. The Mn content in the welding material is 0.5 percent by mass or more, and more preferably 0.7 percent by mass or more. In contrast, Mn, if present in a content of greater than 2.0 percent by mass, may often cause the weld overlay metal to have inferior toughness and weldability. To prevent this, the Mn content is preferably 0.5 to 2.0 percent by mass, and more preferably 0.7 to 1.2 percent by mass.

Chromium (Cr) helps the welding material to give a weld overlay metal having better corrosion resistance, hot hardness, and abrasion resistance. Cr also has such a property as not to inhibit weldability of the weld overlay metal. Cr helps the weld overlay metal to have better abrasion resistance, because Cr forms carbides finely precipitated in grains and acts as a precipitation hardening element. In addition, Cr, as added in combination with Mo mentioned later, helps the weld overlay metal to have a high strength and a high hardness. A welding material having a Cr content of less than 15 percent by mass may fail to give a weld overlay metal having corrosion resistance and abrasion resistance at desired levels. In contrast, a welding material having a Cr content greater than 30 percent by mass may often suffer from the formation of a martensite phase. To prevent these, the Cr content in the welding material is preferably 15 to 30 percent by mass.

Molybdenum (Mo), as added in combination with Cr, helps the welding material to give a weld overlay metal having a higher strength and a higher hardness, as described above. Mo, even when added not in combination with Cr, advantageously helps the steel to have better toughness. Mo, when added in combination with Cr, may preferably be contained in the build-up welding material in a content corresponding to about one-tenth or less the content of Cr. This may help the resulting weld overlay metal to have a higher strength and a higher hardness. Mo is preferably added in a low content in combination with Cr, because Mo is expensive in its raw material. Mo prevents grain coarsening upon high-temperature heating and helps the weld overlay metal to have a higher tensile strength at a high temperature effectively. In addition, Mo contributes to better corrosion resistance of a steel having a high Cr content as with the build-up welding material according to the embodiment. The Mo content is preferably 0.2 to 6.0 percent by mass, and more preferably 0.2 to 1.5 percent by mass, in consideration of balance with other properties. Mo, if contained in a content of greater than 6.0 percent by mass, may segregate at grain boundaries and disadvantageously cause fayalite ($Fe_2SiO_4$), an oxide between Fe and Si, to migrate into the steel.

Nickel (Ni) helps the weld overlay metal to have better corrosion resistance and toughness. Ni in the embodiment is an element selectively added as appropriate, as mentioned below. Ni has a high raw material price. The Ni content is therefore preferably 0.3 to 6.0 percent by mass, more preferably 0.3 to 1.0 percent by mass, and furthermore preferably 0.3 to 0.6 percent by mass, in consideration of the raw material price and properties balance. The Ni content is preferably 0.3 percent by mass or more so as to help the weld overlay metal to have further better corrosion resistance and toughness. In contrast, Ni, if contained in a content of greater than 6.0 percent by mass, may often disadvantageously invite austenite formation.

Vanadium (V) forms a carbide in the weld overlay metal and acts as a precipitation hardening element. V in the embodiment is an element to be selectively added as appropriate as mentioned below. V, when present, helps the weld overlay metal to have better abrasion resistance. In addition, V helps the weld overlay metal to have a refined polycrystalline microstructure and to have better toughness. In contrast, V, if present in a content of greater than 2.0 percent by mass, may be precipitated as VC (vanadium carbide) in a large amount in grains and may thereby cause the weld overlay metal to have inferior toughness. To prevent this, the V content is preferably 0.3 to 2.0 percent by mass, and more preferably 0.3 to 1.5 percent by mass. The V content is preferably 0.3 percent by mass or more to allow the resulting weld overlay metal to have better abrasion resistance.

Tungsten (W) forms a carbide in the weld overlay metal and acts as a precipitation hardening element. W, when present in a content of 0.1 percent by mass or more, may help the weld overlay metal to have better abrasion resistance. In contrast, W, if present in a content of greater than 1.5 percent by mass, may be precipitated as WC (tungsten carbide) in a large amount in grains and may often cause the weld overlay metal to have inferior toughness. To prevent this, the W content is preferably 0.1 to 1.5 percent by mass, and more preferably 0.2 to 1.0 percent by mass.

The build-up welding material according to the embodiment further contains Fe (iron) and inevitable impurities. The inevitable impurities are exemplified by P (phosphorus), S (sulfur), Al (aluminum), Ca (calcium), Ti (titanium), Co (cobalt), Cu (copper), Zr (zirconium), Nb (niobium), Pd (palladium), Ag (silver), Sn (tin), Hf (hafnium), Ta (tantalum), Pt (platinum), Au (gold), and Pb (lead).

Phosphorus (P) imparts cold brittleness to the weld overlay metal. To prevent this, the P content is preferably minimized. Phosphorus is present as an impurity, segregated at grain boundaries, and forms segregation zones (segregation bands) when elongated in a longitudinal (forging) direction typically by forging and rolling. Alpha-iron (α-Fe) is formed in the segregation bands to eliminate carbon from the segregation bands. As a result, α-Fe is zonally formed in the phosphorus segregation bands; whereas pearlite is zonally formed in other areas. This is generally called "ferrite bands". The ferrite bands, if formed, cause the weld overlay metal to have inferior ductility in a direction perpendicular to the bands.

Sulfur (S) imparts hot brittleness to the weld overlay metal. To prevent this, the S content is preferably minimized. Sulfur forms MnS as a sulfide inclusion, is segregated upon steel hot working, and thereby makes the steel brittle.

The inevitable impurities as mentioned above are acceptable when present in a total content of 0.05 percent by mass or less.

Next, a welding method using the build-up welding material according to the embodiment; and a machinery part (e.g., treatment chamber) welded with a weld overlay metal will be illustrated below.

The build-up welding material according to the embodiment may be used in welding of a treatment chamber to house a treatment object in treatment equipment such as pulverizer or tube reactor. A material for the treatment chamber is exemplified by various stainless steels, S25C steel, SC49 steel, and SS400 steel. To suppress dilution of the base metal, the build-up welding material preferably has a chemical composition identical or similar to that of the base metal. It is difficult, however, to allow the build-up welding material to have an identical chemical composition to that of the base metal, because the base metal mainly requires strength and toughness; whereas the build-up welding material mainly requires hardness and abrasion resistance. Accordingly, it is preferable to hold the base metal upright, to perform overlay welding on the base metal as much as possible, and sequentially repeating the overlay welding on the overlaid welding material (weld overlay layer). This may suppress mutual migration of the base metal elements (mainly Fe) and the build-up welding material by gravity or convection. According to this embodiment, the build-up welding material may little suffer from deviation in chemical composition from the machinery part on which the weld overlay metal is welded, except that the contents of Cr, Mo, and Ni are diluted (reduced) to a little extent.

To give a desired weld overlay layer as mentioned above, the build-up welding material according to the embodiment may be subjected to welding under regular welding conditions. However, when the build-up welding material according to the embodiment is used, the base metal is preferably heated upon welding. Specifically, in a preferred embodiment, the base metal is heated at a rate of temperature rise of 100° C. to 300° C. per hour, held at a temperature of 250° C. to 350° C. for welding, and cooled at a cooling rate of 15° C. to 100° C. per hour, whereas welding on the base metal is isothermally performed at the temperature of 250° C. to 350° C.

Technical features of the build-up welding material and machinery part will be summarized below.

The build-up welding material according to one embodiment (aspect) of the present invention contains C in a content of 0.2 to 1.0 percent by mass, Si in a content of 0.2 to 0.5 percent by mass, Mn in a content of 0.5 to 2.0 percent by mass, Cr in a content of 15 to 30 percent by mass, Mo in a content of 0.2 to 6.0 percent by mass, and W in a content of 0.1 to 1.5 percent by mass, with the remainder including Fe and inevitable impurities.

The build-up welding material according to the embodiment of the present invention, when used in overlay welding, can give a weld overlay metal that excels in acid-corrosion resistance and abrasion resistance. The build-up welding material, when used in overlay welding, can therefore give a treatment chamber that excels in corrosion resistance and abrasion resistance and has a long life. A weld overlay layer formed with the build-up welding material has excellent ductility and toughness. The formed weld overlay layer therefore resists cracking after welding and exhibits excellent welding workability. The build-up welding material, when used in multi-layer overlay welding on an existing weld overlay layer, contributes to satisfactory cracking resistance and to excellent adhesion between the existing weld overlay layer and a new weld overlay layer. The build-up welding material therefore exhibits excellent repairability. In addition, the formed weld overlay layer has excellent cracking resistance and adhesion with a hard chrome coating, on which surface a hard chrome coated layer can be satisfactorily formed.

The build-up welding material having the configuration preferably further contains V in a content of 0.3 to 2.0 percent by mass.

The build-up welding material according to the embodiment of the present invention, when containing V in a content within the range, may give a weld overlay metal having better abrasion resistance and exhibiting better toughness due to refinement of the polycrystalline microstructure.

The build-up welding material having the configuration preferably further contains Ni in a content of 0.3 to 6.0 percent by mass.

The build-up welding material according to the embodiment of the present invention, when containing Ni in a content within the range, may give a weld overlay metal having better corrosion resistance and toughness.

The C content is preferably 0.3 to 0.8 percent by mass.

The build-up welding material according to the embodiment of the present invention, when containing C in a content within the range, may give a weld overlay metal maintaining better balance between tensile strength and elongation.

The Mn content is preferably 0.7 to 1.2 percent by mass.

The build-up welding material according to the embodiment of the present invention, when containing Mn in a content within the range, may give a weld overlay metal surely having a strength and toughness at satisfactory levels.

The Mo content is preferably 0.2 to 1.5 percent by mass.

The build-up welding material according to the embodiment of the present invention, when containing Mo in a content within the range, may give a weld overlay metal having a higher strength and a higher hardness.

The W content is preferably 0.2 to 1.0 percent by mass.

The build-up welding material according to the embodiment of the present invention, when containing W in a content within the range, may give a weld overlay metal having better abrasion resistance.

The Ni content is preferably 0.3 to 1.0 percent by mass.

The build-up welding material according to the embodiment of the present invention, when containing Ni in a content within the range, may give a weld overlay metal having better corrosion resistance and toughness.

The machinery part according to another embodiment (aspect) of the present invention includes a base steel; and a weld overlay metal welded on or over a surface of the base steel, in which the weld overlay metal has a surface layer and contains C in a content of 0.2 to 1.0 percent by mass, Si in a content of 0.2 to 0.5 percent by mass, Mn in a content of 0.5 to 2.0 percent by mass, Cr in a content of 15 to 30 percent by mass, Mo in a content of 0.2 to 6.0 percent by mass, and W in a content of 0.1 to 1.5 percent by mass, with the remainder including Fe and inevitable impurities, in a chemical composition in the surface layer.

The machinery part according to the embodiment of the present invention may be exemplified by a treatment chamber for use in treatment equipment such as pulverizer or tube reactor. The machinery part has a surface layer having satisfactory cracking resistance and excellent adhesion with a hard chrome coating, on which surface layer a hard chrome coated layer can be satisfactorily formed.

The weld overlay metal with which the machinery part is welded preferably further contains Vin a content of 0.3 to 2.0 percent by mass.

The weld overlay metal containing V in a content within the range may have excellent abrasion resistance and toughness. The machinery part welded with the weld overlay metal as above can therefore bear, on a surface layer thereof, a hard chrome coated layer formed more satisfactorily.

The weld overlay metal with which the machinery part is welded preferably further contains Ni in a content of 0.3 to 6.0 percent by mass.

The weld overlay metal containing Ni in a content within the range may have excellent corrosion resistance and toughness. The machinery part welded with the weld overlay metal as above can therefore bear, on a surface layer thereof, a hard chrome coated layer formed more satisfactorily.

The weld overlay metal with which the machinery part is welded preferably contains C in a content of 0.3 to 0.8 percent by mass.

The weld overlay metal containing C in a content within the range may maintain better balance between tensile strength and elongation. The machinery part welded with the weld overlay metal as above can therefore bear, on a surface layer thereof, a hard chrome coated layer formed more satisfactorily.

The weld overlay metal with which the machinery part is welded preferably contains Mn in a content of 0.7 to 1.2 percent by mass.

The weld overlay metal containing Mn in a content within the range may surely have a strength and toughness at satisfactory levels. The machinery part welded with the weld overlay metal as above can therefore bear, on a surface layer thereof, a hard chrome coated layer formed more satisfactorily.

The weld overlay metal with which the machinery part is welded preferably contains Mo in a content of 0.2 to 1.5 percent by mass.

The weld overlay metal containing Mo in a content within the range may excel in strength and hardness. The machinery part welded with the weld overlay metal as above can therefore bear, on a surface layer thereof, a hard chrome coated layer formed more satisfactorily.

The weld overlay metal with which the machinery part is welded preferably contains Win a content of 0.2 to 1.0 percent by mass.

The weld overlay metal containing Win a content within the range may have more excellent abrasion resistance. The machinery part welded with the weld overlay metal as above can therefore bear, on a surface layer thereof, a hard chrome coated layer formed more satisfactorily.

The weld overlay metal with which the machinery part is welded preferably contains Ni in a content of 0.3 to 1.0 percent by mass.

The weld overlay metal containing Ni in a content within the range may have more excellent corrosion resistance and toughness. The machinery part welded with the weld overlay metal as above can therefore bear, on a surface layer thereof, a hard chrome coated layer formed more satisfactorily.

EXAMPLES

Several experimental examples in the present invention will be illustrated below. It should be noted, however, that the examples are never construed to limit the scope of the invention; that various changes and modifications are possible therein without departing from the spirit and scope of the invention; and all such changes and modifications fall within the scope of the invention.

Experimental Example 1

Each of welding materials given in Table 2 were prepared, subjected to overlay welding on a surface of a base metal including S25C steel, to form a weld overlay layer having an average thickness of about 3 mm. The chemical compositions given in Table 2 each include Fe and inevitable impurities as the remainder. The welding was performed in a manner as follows. The base metal was heated from room temperature up to 300° C. at a rate of temperature rise of 100° C. per hour; subjected to overlay welding while being isothermally held at a temperature of 300° C.; and, after the completion of welding, cooled down to room temperature at a cooling rate of 20° C. per hour. The welding was performed in a flat position and at a current of 280 A and a voltage of 30 V with a heat input of 2.0 kJ/mm. Table 3 indicates the chemical composition specification of the carbon steel for machine structural use (S25C steel) used as the base metal.

TABLE 2

| | Alloy chemical composition (in mass percent) | | | | | | | | | | |
|---|---|---|---|---|---|---|---|---|---|---|---|
| No. | C | Si | Mn | Cr | Mo | Ni | V | W | Co | Fe | Remarks |
| No. 1 | 0.7 | 0.9 | 1.2 | 12 | 3.8 | 0.7 | 2 | 0.9 | — | Bal. | Conventional Example |
| No. 2 | 0.4 | 0.2 | 0.7 | 13.5 | 0.3 | — | — | — | — | Bal. | Conventional Example |
| No. 3 | 2.5 | — | — | 33 | — | — | — | 13 | Bal. | — | Conventional Example |
| No. 4 | 1 | — | — | 26 | — | — | — | 5 | Bal. | — | Conventional Example |
| No. 5 | 0.4 | 0.2 | 0.6 | 13 | 0.3 | — | — | — | — | Bal. | Conventional Example |
| No. 6 | 4.5 | 0.7 | 1.1 | 31 | 1.6 | — | — | — | — | Bal. | Conventional Example |
| No. 11 | 0.25 | 1.1 | 1.1 | 35 | 4 | 1.1 | 2 | 1.1 | — | Bal. | Comparative Example |
| No. 12 | 0.4 | 1.1 | 1.1 | 35 | 4 | 1.1 | 2 | 1.1 | — | Bal. | Comparative Example |
| No. 13 | 0.7 | 1.1 | 1.1 | 35 | 4 | 1.1 | 2 | 1.1 | — | Bal. | Comparative Example |

TABLE 2-continued

| No. | C | Si | Mn | Cr | Mo | Ni | V | W | Co | Fe | Remarks |
|---|---|---|---|---|---|---|---|---|---|---|---|
| No. 14 | 1 | 1.1 | 1.1 | 35 | 4 | 1.1 | 2 | 1.1 | — | Bal. | Comparative Example |
| No. 15 | 1.5 | 1.1 | 1.1 | 35 | 4 | 1.1 | 2 | 1.1 | — | Bal. | Comparative Example |
| No. 16 | 0.7 | 0.3 | 1.1 | 35 | 4 | 1.1 | 2 | 1.1 | — | Bal. | Comparative Example |
| No. 17 | 0.7 | 2 | 1.1 | 35 | 4 | 1.1 | 2 | 1.1 | — | Bal. | Comparative Example |
| No. 18 | 0.7 | 2.5 | 1.1 | 35 | 4 | 1.1 | 2 | 1.1 | — | Bal. | Comparative Example |
| No. 19 | 0.7 | 3 | 1.1 | 35 | 4 | 1.1 | 2 | 1.1 | — | Bal. | Comparative Example |
| No. 20 | 0.7 | 1.1 | 1.1 | 35 | 4 | 2.1 | 4 | 2.1 | — | Bal. | Comparative Example |
| No. 31 | 0.4 | 0.3 | 0.9 | 20 | 0.5 | — | 1 | 0.5 | — | Bal. | Example |
| No. 32 | 0.3 | 0.2 | 9 | 20 | 0.5 | — | 0.5 | 0.3 | — | Bal. | Comparative Example |
| No. 33 | 0.4 | 0.3 | 0.9 | 25 | 0.5 | — | 1 | 0.5 | — | Bal. | Example |
| No. 34 | 0.4 | 0.3 | 0.9 | 25 | 0.5 | — | 0.5 | 0.3 | — | Bal. | Example |
| No. 35 | 0.4 | 0.3 | 0.9 | 30 | 0.5 | — | 1 | 0.5 | — | Bal. | Example |
| No. 36 | 0.4 | 0.3 | 0.9 | 20 | 1 | 0.5 | 1.5 | 1 | — | Bal. | Example |
| No. 37 | 0.4 | 0.3 | 0.9 | 25 | 1 | 0.5 | 1.5 | 1 | — | Bal. | Example |
| No. 38 | 0.1 | 0.3 | 0.9 | 25 | 0.5 | — | 1 | 0.5 | — | Bal. | Comparative Example |
| No. 39 | 0.6 | 0.3 | 0.9 | 25 | 0.5 | — | 1 | 0.5 | — | Bal. | Example |
| No. 40 | 0.4 | 0.1 | 0.9 | 25 | 0.5 | — | 1 | 0.5 | — | Bal. | Comparative Example |
| No. 41 | 0.4 | 0.8 | 0.9 | 25 | 0.5 | — | 1 | 0.5 | — | Bal. | Comparative Example |
| No. 42 | 0.4 | 0.3 | 0.3 | 25 | 0.5 | — | 1 | 0.5 | — | Bal. | Example |
| No. 43 | 0.4 | 0.3 | 2.5 | 25 | 0.5 | — | 1 | 0.5 | — | Bal. | Comparative Example |
| No. 44 | 0.4 | 0.3 | 0.9 | 15 | 0.5 | — | 1 | 0.5 | — | Bal. | Example |
| No. 45 | 0.4 | 0.3 | 0.9 | 35 | 0.5 | — | 1 | 0.5 | — | Bal. | Comparative Example |
| No. 46 | 0.4 | 0.3 | 0.9 | 25 | 0.1 | — | 1 | 0.5 | — | Bal. | Comparative Example |
| No. 47 | 0.4 | 0.3 | 0.9 | 25 | 2 | — | 1 | 0.5 | — | Bal. | Example |
| No. 48 | 0.4 | 0.3 | 0.9 | 25 | 0.5 | 1 | 1 | 0.5 | — | Bal. | Example |
| No. 49 | 0.4 | 0.3 | 0.9 | 25 | 0.5 | 1.5 | 1 | 0.5 | — | Bal. | Example |
| No. 50 | 0.4 | 0.3 | 0.9 | 25 | 0.5 | — | — | 0.5 | — | Bal. | Example |
| No. 51 | 0.4 | 0.3 | 0.9 | 25 | 0.5 | — | 2 | 0.5 | — | Bal. | Example |
| No. 52 | 0.4 | 0.3 | 0.9 | 25 | 0.5 | — | 3 | 0.5 | — | Bal. | Comparative Example |
| No. 53 | 0.4 | 0.3 | 0.9 | 25 | 0.5 | — | 1 | — | — | Bal. | Comparative Example |
| No. 54 | 0.4 | 0.3 | 0.9 | 25 | 0.5 | — | 1 | 1.5 | — | Bal. | Example |
| No. 55 | 0.4 | 0.3 | 0.9 | 25 | 0.5 | — | 1 | 2 | — | Bal. | Comparative Example |
| No. 61 | 0.2 | 0.3 | 1 | 25 | 0.5 | — | 1 | 0.5 | — | Bal. | Example |
| No. 62 | 0.7 | 0.3 | 1 | 25 | 0.5 | — | 1 | 0.5 | — | Bal. | Example |
| No. 63 | 1 | 0.3 | 1 | 25 | 0.5 | — | 1 | 0.5 | — | Bal. | Example |
| No. 64 | 1.5 | 0.3 | 1 | 25 | 0.5 | — | 1 | 0.5 | — | Bal. | Comparative Example |

TABLE 3

| Material | C | Si | Mn | P | S | Fe |
|---|---|---|---|---|---|---|
| S25C steel | 0.20~0.30 | 0.15~0.40 | 0.30~0.60 | <0.045 | <0.045 | Bal. |

Of the welding materials, each of the welding materials Nos. 1 to 6, 11 to 15, 17 to 20, and 62 to 64 was used in welding, and the chemical composition of a surface layer of the resulting weld overlay metal was analyzed. Table 4 indicates analysis results. As used herein the term "surface layer" refers to a region within 1 mm deep from the surface. The surface layer was mechanically shaved off from the weld overlay metal, dissolved in a predetermined acid, and the chemical composition of the weld overlay metal was quantitatively analyzed by chemical analyses. The quantitative analyses in the chemical analyses were performed by infrared-absorbing analysis on carbon (C), gravimetry on Si, and inductively coupled plasma (ICP) emission spectrometry on other elements.

TABLE 4

| No. | Alloy chemical composition (in mass percent) | | | | | | | | | | Remarks |
|---|---|---|---|---|---|---|---|---|---|---|---|
| | C | Si | Mn | Cr | Mo | Ni | V | W | Co | Fe | |
| No. 1 | 0.52 | 0.82 | 0.81 | 8.44 | 2.78 | 0.47 | 1.43 | 0.56 | — | Bal. | Conventional Example |
| No. 2 | 0.37 | 0.22 | 0.59 | 12.13 | 0.27 | — | — | — | — | Bal. | Conventional Example |
| No. 3 | 2.18 | — | — | 21.83 | — | — | — | 0.21 | Bal. | 9.57 | Conventional Example |
| No. 4 | 1.16 | — | — | 29.99 | — | — | — | 4.53 | Bal. | 7.98 | Conventional Example |
| No. 5 | 0.37 | 0.22 | 0.59 | 12.13 | 0.27 | — | — | — | — | Bal. | Conventional Example |
| No. 6 | 3.64 | 0.87 | 1.05 | 27.03 | 0.7 | — | — | — | — | Bal. | Comparative Example |
| No. 11 | 0.23 | 0.89 | 0.77 | 21.02 | 2.28 | 0.66 | 1.38 | 0.75 | — | Bal. | Comparative Example |
| No. 12 | 0.32 | 0.94 | 0.88 | 24.55 | 2.62 | 0.78 | 1.64 | 0.83 | — | Bal. | Comparative Example |
| No. 13 | 0.58 | 1.13 | 0.95 | 28.01 | 3 | 0.86 | 1.82 | 0.82 | — | Bal. | Comparative Example |
| No. 14 | 0.69 | 1.04 | 1.03 | 27.07 | 2.77 | 0.77 | 1.78 | 0.84 | — | Bal. | Comparative Example |
| No. 15 | 1.08 | 1.01 | 0.9 | 24.82 | 2.54 | 0.71 | 1.55 | 0.78 | — | Bal. | Comparative Example |
| No. 17 | 0.54 | 1.55 | 0.84 | 25.4 | 2.68 | 0.73 | 1.61 | 0.79 | — | Bal. | Comparative Example |
| No. 18 | 0.64 | 1.99 | 0.96 | 30.45 | 3.12 | 0.87 | 1.98 | 0.97 | — | Bal. | Comparative Example |
| No. 19 | 0.6 | 2.1 | 0.9 | 27.52 | 2.85 | 0.78 | 1.72 | 0.91 | — | Bal. | Comparative Example |
| No. 20 | 0.62 | 0.99 | 0.76 | 25.77 | 2.77 | 1.49 | 3.22 | 2.02 | — | Bal. | Comparative Example |
| No. 63 | 0.58 | 0.22 | 0.76 | 16.15 | 0.35 | — | 0.71 | 0.35 | — | Bal. | Example |
| No. 64 | 1.02 | 0.24 | 0.69 | 13.12 | 0.32 | — | 0.55 | 0.31 | — | Bal. | Comparative Example |

Fe as a principal element of a base metal migrates from the base metal into a weld overlay metal to dilute C, Si, Mn, and Cr in content. The resulting weld overlay metal may often have contents of the elements C, Si, Mn, and Cr respectively lower than those in the welding material (raw material). The contents of C, Si, Mn, and Cr may be lowered by 0 to 20 percent by mass. In contrast, the other elements (Mo, Ni, V, and W) indicate not significant reduction, but slight reduction in content.

As is indicated in Table 4, the welding materials Nos. 3 and 4 corresponding to conventional examples were Co alloys not containing Fe inherently, but the resulting weld overlay metals contained Fe as detected, because Fe migrated from the base metal. In particular, this caused the welding material No. 3 to have lower Cr and W contents, but reductions in contents were about 30 percent by mass and not so significant. Other elements (C, P, and S) than Cr and W were contained in contents substantially the same as those in the welding material (raw material). The weld overlay metal of No. 4 did not have significant changes in the contents of elements, demonstrating that there was a small difference in chemical composition between the welding material and the weld overlay metal.

Experimental Example 2

To evaluate ductility as a factor determining welding workability, each weld overlay metal prepared with each welding material was subjected to a tensile test, based on which a tensile strength (TS) and an elongation percentage (EL) were measured. Initially, each of welding materials given in Table 2 was subjected to overlay welding on a surface of a base metal including S25C steel by the procedure of Experimental Example 1 to form a weld overlay layer having an average thickness of about 3 mm.

The tensile test was performed according to Japanese Industrial Standard (JIS) Z2201 using a No. 14A test specimen. Specifically, a sample was sampled in parallel with weld beads from a weld overlay layer formed by the method, from which a non-proportional test specimen 1 (Gleeble test specimen) as illustrated in FIG. 1 was prepared and subjected to the tensile test. The numerical values in FIG. 1 are indicated in millimeter (mm). A constant load was applied so that force in the axial direction alone was applied to the non-proportional test specimen 1 using a Grade 1 tensile testing machine as prescribed in JIS B 7721 "Tension/compression testing machines—Verification and calibration of the force-measuring system."

A tensile strength (tenacity) and an elongation after fracture were determined in the test. Specifically, a tensile strength ($\sigma B$) and an elongation after fracture ($\delta$) were calculated by Expressions (1) and (2), respectively. As used herein the term "tensile strength" refers to a stress (N/mm$^2$) corresponding to the maximum force applied during the test; and the term "elongation after fracture" refers to a value in percent obtained by indicating the permanent elongation after fracture in percentage with respect to the initial gauge length. Table 5 indicates the tensile test results of the respective weld overlay layers. Expressions (1) and (2) are expressed as follows:

$$\sigma B = F\text{max}/A_0 \quad (1)$$

where Fmax represents the maximum tensile force (N); and $A_0$ represents the initial cross-sectional area (mm$^2$);

$$\delta = (l - l_0)/l_0 \times 100 \quad (2)$$

where l represents the gauge length (mm) as measured by butting a pair of fracture surfaces so that center lines of the two fractured pieces derived from the test specimen are aligned with each other, and $l_0$ represents the initial gauge length (mm).

TABLE 5

| No. | Tensile test Tensile strength (MPa) | Elonga- tion (%) | Hardness HRC | Hardness HV | Weight loss on abrasion (g) | Remarks |
|---|---|---|---|---|---|---|
| No. 1 | 1097 | 0 | 58.6 | 629 | 4.84 | Conventional Example |
| No. 2 | 1066 | 13.7 | 37.3 | 369 | 6.56 | Conventional Example |
| No. 3 | — | — | — | — | — | Conventional Example |
| No. 4 | 976 | 2.4 | 43.7 | 405 | 5.74 | Conventional Example |
| No. 5 | — | — | — | — | — | Conventional Example |
| No. 6 | — | — | 56.7 | 590 | 0.74 | Conventional Example |
| No. 11 | — | — | 25.4 | 262 | 0 | Comparative Example |
| No. 12 | — | — | 28.7 | 289 | — | Comparative Example |
| No. 13 | 718 | 1 | 34.1 | 374 | 3.07 | Comparative Example |
| No. 14 | 770 | 1.6 | 31.5 | 298 | — | Comparative Example |
| No. 15 | 850 | 1.6 | 35.8 | 366 | 3.32 | Comparative Example |
| No. 20 | — | — | 36.1 | 349 | 3.19 | Comparative Example |
| No. 32 | 1126 | 14.5 | — | — | — | Comparative Example |
| No. 34 | 1120 | 9.8 | — | — | — | Example |
| No. 35 | 613 | 22.3 | — | — | — | Example |
| No. 36 | 1191 | 9.1 | — | — | — | Example |
| No. 38 | 487 | 16.4 | 15.8 | 169 | 3.08 | Comparative Example |
| No. 39 | 1118 | 11.3 | 42.6 | 421 | 2.73 | Example |
| No. 40 | 516 | 14.5 | 26.3 | 245 | 3.12 | Comparative Example |
| No. 41 | 1268 | 10.9 | 32.6 | 339 | 2.88 | Comparative Example |
| No. 42 | 890 | 14 | 26.8 | 270 | 2.36 | Example |
| No. 43 | 1210 | 12.1 | 39.6 | 431 | 2.64 | Comparative Example |
| No. 44 | 964 | 14.8 | 25.2 | 236 | 3.65 | Example |
| No. 45 | 523 | 12.8 | 36.8 | 364 | 1.83 | Comparative Example |
| No. 46 | 874 | 12.9 | 29.9 | 311 | 3.29 | Comparative Example |
| No. 47 | 1195 | 13.6 | 30.8 | 336 | 2.86 | Example |
| No. 48 | 1041 | 14.1 | 30.4 | 283 | 2.92 | Example |
| No. 49 | 1121 | 14.9 | 31.1 | 321 | 2.76 | Example |
| No. 50 | 761 | 13.3 | 28.9 | 271 | 4.34 | Example |
| No. 51 | 1291 | 25.8 | 34.3 | 367 | 1.64 | Example |
| No. 52 | 1310 | 10.6 | 35.1 | 347 | 1.31 | Comparative Example |
| No. 53 | 732 | 13 | 24.6 | 255 | 4.87 | Comparative Example |
| No. 54 | 1186 | 23.2 | 38 | 414 | 1.55 | Example |
| No. 55 | 1393 | 11.4 | 43.3 | 461 | 1.08 | Comparative Example |
| No. 62 | 1096 | 11.1 | 37.7 | 387 | 2.72 | Example |
| No. 63 | 1249 | 10.2 | 49.8 | 405 | 1.65 | Example |
| No. 64 | 1331 | 9.6 | 55.4 | 603 | 1.29 | Comparative Example |

As is indicated in Table 5, alloy elements affected in the following manner. Specifically, the samples often had a lower tensile strength with a lower C or Si content; whereas the samples often had a lower tensile strength with a higher Cr content. Samples having a C content and a Si content, respectively, of 0.1 percent by mass (samples prepared with the build-up welding materials Nos. 38 and 40) had a low tensile strength of about 500 MPa, demonstrating that the C and Si contents is desirably 0.2 percent by mass or more.

As is indicated in Table 5, samples having higher C and Si contents had a higher tensile strength; whereas samples having a higher Cr content had a lower tensile strength. This is because C and Si contribute to a higher tensile strength mainly by solute strengthening; whereas Cr allows intermetallic compounds to be finely precipitated, thereby allows the polycrystalline microstructure to be finer, and contributes to better toughness. The sample having a Cr content of 30 percent by mass or more (sample prepared with the build-up welding material No. 45) had a low tensile strength of about 500 MPa, demonstrating that the Cr content is desirably 30 percent by mass or less.

Samples having higher V and W contents often had a higher elongation after fracture. This is probably because the elongation after fracture can be grasped as one of measures for toughness evaluation; and V and W contribute to the refinement of the polycrystalline microstructure and thereby contribute to better toughness. A sample having V and W contents of 1.11 and 0.45 percent by mass, respectively (sample prepared with the build-up welding material No. 35) had an elongation after fracture of 22.3% Each of them had a high elongation after fracture. In contrast, a sample having a V content of 3.0 percent by mass (sample prepared with the build-up welding material No. 52) has an elongation after fracture of 10.6%; whereas a sample having a W content of 2.0 percent by mass (sample prepared with the build-up welding material No. 55) had an elongation after fracture of 11.4%. Each of them had a low elongation after fracture. This is probably because large amounts of VC or WC were precipitated in grains, and thereby precipitation hardening predominantly acted. The data demonstrate that V and W contents are desirably 2.0 percent by mass or less and 1.5 percent by mass or less, respectively.

Samples prepared typically with the build-up welding materials Nos. 41, 43, 47, 49, 52, and 55 each had a tensile strength of 1121 to 1393 MPa and an elongation of 10.6% to 14.9% both at relatively satisfactory levels. The samples, however, had a high content of one of the alloy elements Si, Mn, Mo, Ni, V, and W and invited a high raw material price. This demonstrates that the samples are not optimal in consideration of balance between price (cost) and properties.

Experimental Example 3

To evaluate toughness as a factor determining welding workability, weld overlay metals were prepared by overlay welding with each of the welding materials, subjected to a Charpy impact test, in which an impact was measured. Initially, each of welding materials given in Table 2 was subjected to overlay welding on a surface of a base metal including S25C steel by the procedure of Experimental Example 1 to form a weld overlay layer having an average thickness of about 3 mm.

The Charpy impact test was performed according to JIS Z2242 by sampling a sample from the weld overlay layer in parallel with the weld beads (weld axis), and preparing an impact test specimen therefrom. The impact test specimen was a strip (square bar) having dimensions of 10 mm by 10 mm in cross section and a length of 5 mm. The test specimen has a longitudinal direction corresponding to the weld direction. A notch having a width of 2 mm and a depth of 2 mm was notched in one of the four sides of the impact test specimen in a direction perpendicular to the longitudinal direction of the impact test specimen, and an impact was applied in parallel with the weld beads.

Figure 2:
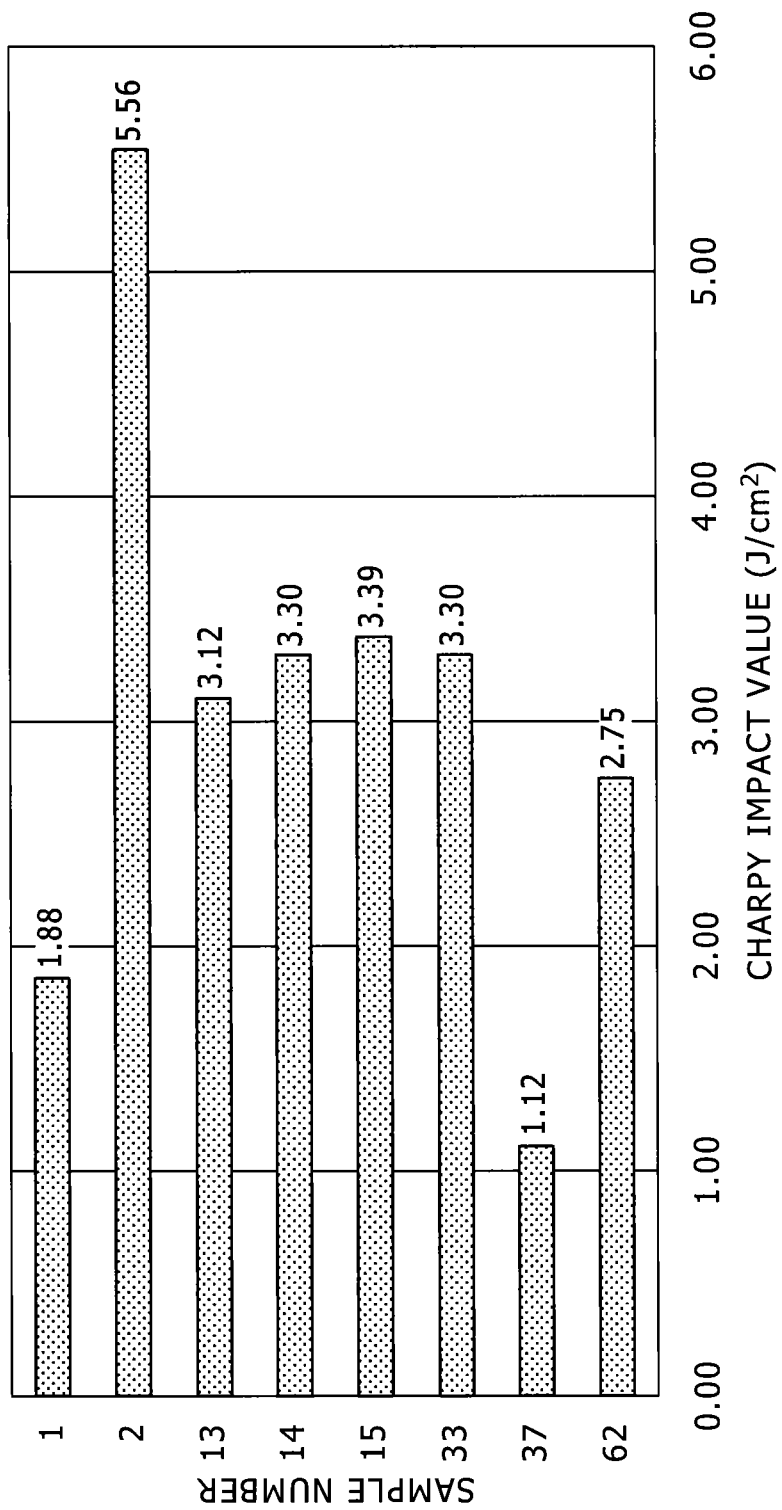
FIG. 2 is a graph illustrating results of Charpy impact tests in Experimental Example 3.

The impact test was performed with a Charpy impact tester according to JIS B7722, in which energy necessary for breaking the impact test specimen was calculated by Expressions (3) and (4), from which a Charpy impact per unit cross-sectional area was determined. FIG. 2 indicates the Charpy impacts of the respective weld overlay layers.

$$E = M(\cos \beta - \cos \alpha) \quad (3)$$

$$M = Wr \quad (4)$$

where E represents the energy (J) necessary for breaking the test specimen; M represents the moment (N·m) around the rotating shaft of hammer, W represents the impact load (N) as hammer mass; r represents the length (m) between the rotating shaft center of hammer to the center of gravity; α represents the angle of fall of hammer, and β represents the angle of hammer at the end of swing after breaking of the test specimen.

As is illustrated in FIG. 2, there was observed no large difference in Charpy impact value between the weld overlay metals having different chemical compositions, except that the test specimen prepared with the build-up welding material No. 2 had a high Charpy impact value. Fracture surfaces of all the test specimens after the tests were brittle fracture surfaces as observed, indicating that the test specimens exhibited intense brittleness. The samples according to the embodiment of the present invention (test specimens prepared with the build-up welding material No. 62) each had a relatively high Charpy impact value and were found to have better toughness.

Experimental Example 4

A weld overlay metal was prepared with each build-up welding material, and surface hardness of the weld metal was measured. A Rockwell hardness (Rockwell hardness C-scale; HRC) and a Vickers hardness (HV) were measured as the surface hardness. Initially, each of the welding materials in Table 2 was subjected to overlay welding on a surface of a base metal including S25C steel by the procedure of Experimental Example 1 to form a weld overlay layer having an average thickness of about 3 mm. The Rockwell hardness was determined according to a Rockwell hardness test prescribed in JIS G0202. Specifically, a cone having an included angle of 120° and a radius of curvature at the tip of 0.3 mm was forced into the surface of the weld overlay metal with a load of 60 kgf. A permanent depth of indentation from the reference plane was read when the force was returned to the preliminary test force (load) of 10 kgf, and the Rockwell hardness was determined according to the Rockwell hardness computational expression. The Rockwell hardness was calculated with the C-scale.

The Vickers hardness was measured with a MVK-E Vickers hardness tester supplied by Akashi Corporation (now Mitsutoyo Corporation). A square pyramid diamond indenter having an angle α between opposite faces of 136° was forced into the surface of the weld overlay metal. A surface area S (mm$^2$) was calculated from the length d (mm) of a diagonal of an indentation remained after load removal. The Vickers hardness was calculated from the relation between the test force and the surface area according to a predetermined computational expression.

Table 5 indicates the Rockwell harnesses of the respective weld overlay metals. Weld overlay metals prepared with the build-up welding materials No. 1 having a high total content of Mo, Ni, V, and W and No. 6 having a high C content exhibited a high hardness.

Table 5 indicates the Vickers harnesses of the respective weld overlay metals. The Vickers hardness had a tendency almost the same as the Rockwell hardness. Weld overlay metals prepared with the build-up welding materials No. 1 having a high total content of Mo, Ni, V, and W and No. 6 having a high C content exhibited a high Vickers hardness. In contrast, weld overlay metals prepared according to the embodiment of the present invention (weld overlay metals prepared with the build-up welding materials Nos. 62, and 63) had a Vickers hardness of about 300 or more, indicating that they had such a hardness as to be usable as a weld overlay metal without problem.

Experimental Example 5

Each weld overlay metal was evaluated on corrosion resistance. Samples were prepared in a manner as follows. Each of welding materials given in Table 2 was subjected to overlay welding on a surface of a base metal including S25C steel by the procedure of Experimental Example 1 to form a weld overlay layer having an average thickness of about 3 mm. A test specimen (corrosion coupon) 15 mm by 15 mm by 15 mm was sampled as a sample from the weld overlay layer by machining (wire cutting). A testing solution was prepared by mixing hydrochloric acid (HCl) and sulfuric acid ($H_2SO_4$) in a molarity ratio of 1:1 to give an aqueous solution (mixed acid aqueous solution) and diluting the aqueous solution with ion-exchanged water so as to have a pH of 2.0. The sample was immersed in the testing solution at 80° C. for 24 hours or 240 hours, the weight loss on corrosion after the test was measured, based on which the corrosion resistance was evaluated. Three specimens per one weld overlay layer sample were subjected to the measurement. The weight losses on corrosion of the three specimens were averaged to give an average corrosion amount, and this was converted based on the specimen surface area and the corrosion time into an annual rate as an average corrosion rate (mm/y).

Figure 3:
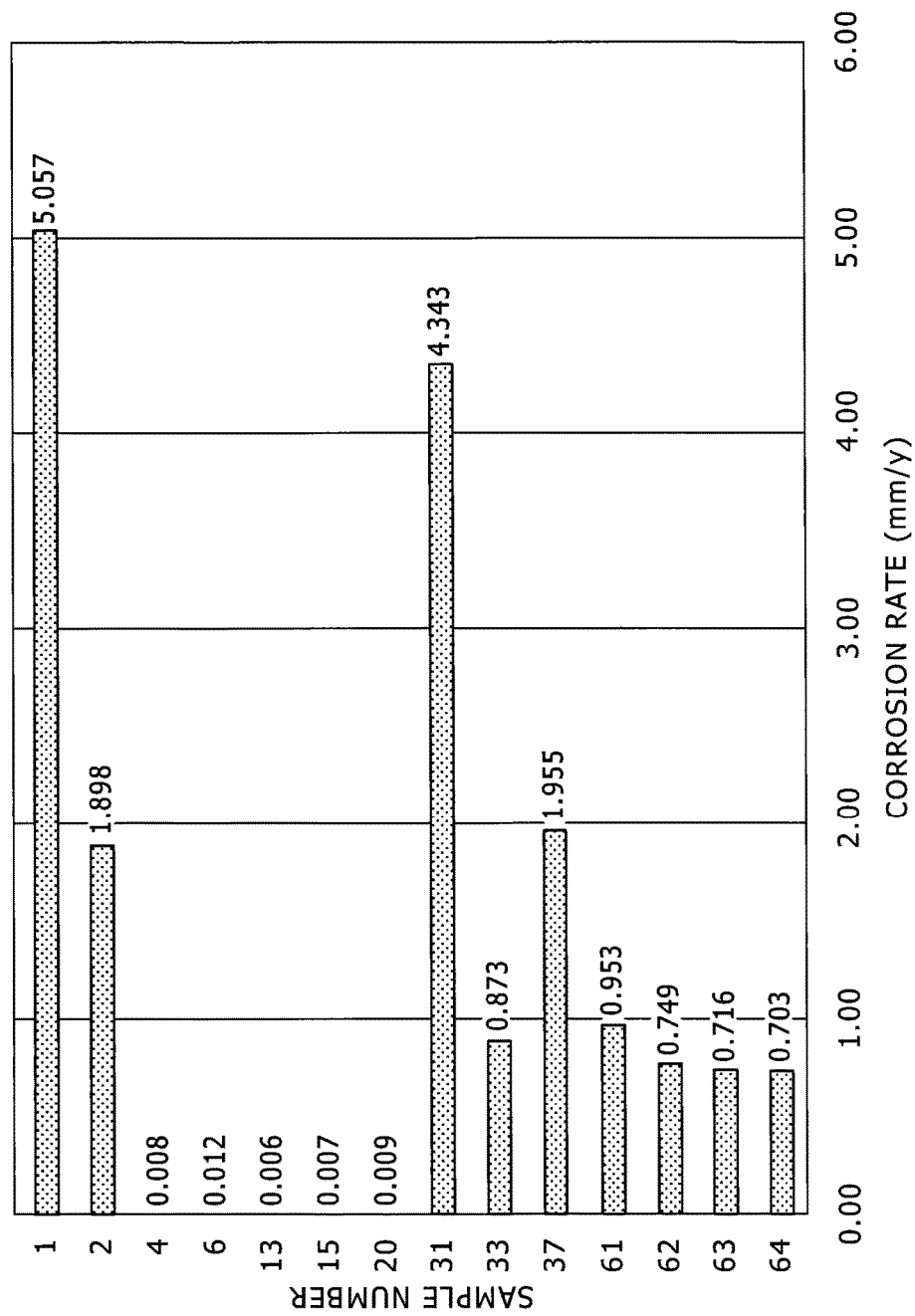
FIG. 3 is a graph illustrating results of corrosion tests in Experimental Example 5.

FIG. 3 illustrates the corrosion resistance evaluation results of the respective weld overlay metals. FIG. 3 indicates as follows. Of the conventional build-up welding materials in Table 1, the build-up welding materials Nos. 1 and 2 gave weld overlay metals that had a high average corrosion rate and exhibited inferior corrosion resistance; whereas the build-up welding materials Nos. 4 and 6 gave weld overlay metals that had a low average corrosion rate and exhibited good corrosion resistance. The build-up welding materials Nos. 13, 15, and 20 also gave weld overlay metals that had a low average corrosion rate and exhibited good corrosion resistance. In contrast, weld overlay metals prepared according to the embodiment of the present invention (weld overlay metals prepared with the build-up welding materials Nos. 62 and 63) had a relatively high average corrosion rate, but did not have corrosion resistance inferior to that of the conventional build-up welding materials, and maintained corrosion resistance equal to or higher than that of the conventional build-up welding materials.

Experimental Example 6

Figure 4:
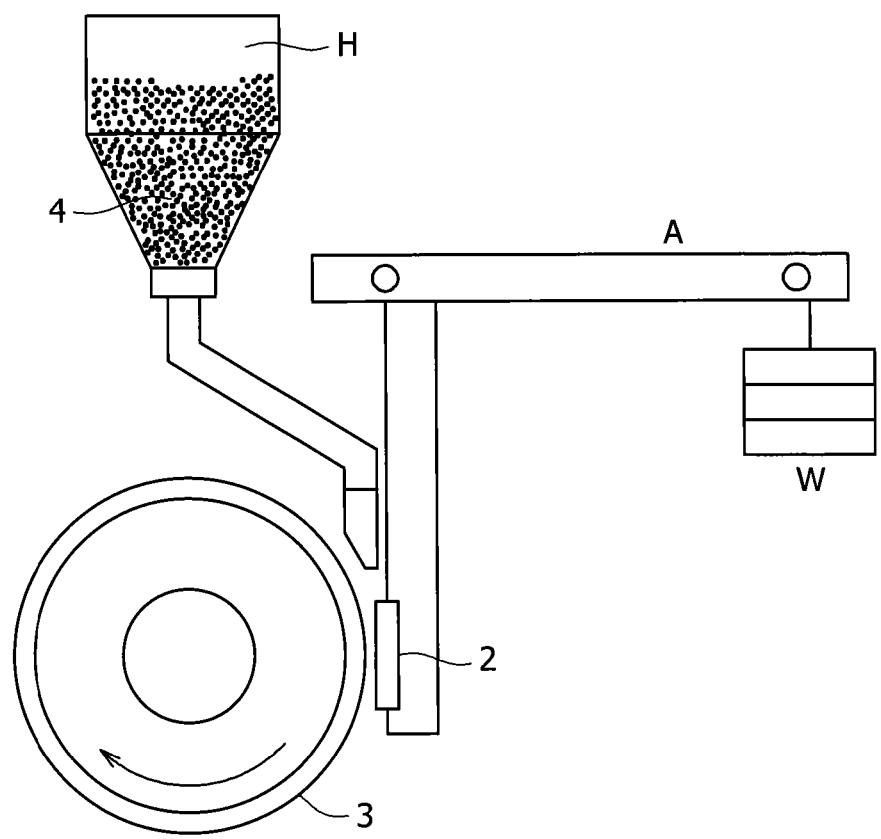
FIG. 4 is a conceptual diagram illustrating sand abrasion test equipment used in abrasion resistance tests in Experimental Example 6.

Each weld overlay metal was evaluated on abrasion resistance. The abrasion resistance was evaluated by a sand abrasion test prescribed in American Society for Testing and Materials' Standard (ASTM) G65. FIG. 4 depicts a conceptual diagram of sand abrasion testing equipment. A test specimen 2 including the weld overlay metal was pressed to a rubber-coated wheel 3 at a load of 133 kgf; the rubber-coated wheel 3 was rotated a predetermined times (6000 revolutions); and a weight loss on abrasion after the test was measured to evaluate the abrasion resistance. A testing sand 4 was fed from a hopper H to between the test specimen 2 and the rubber-coated wheel 3, as illustrated in FIG. 4. The pressing force of the test specimen 2 toward the rubber-coated wheel 3 was given by a lever arm A, where a weight W was hung at a free end of the lever arm. The testing sand 4 used was Silver Silica Sand No. 6. The rubber-coated wheel 3 was rotated at a rotation speed of 145 rpm. Table 5 indicates the abrasion resistance evaluation results of the respective weld overlay metals.

Table 5 indicates as follows. Of the conventional build-up welding materials in Table 1, the build-up welding materials Nos. 1, 2, and 4, except for No. 6, gave weld overlay metals that had a large weight loss on abrasion of about 5 to 6 g and were found to have inferior abrasion resistance. In contrast, the build-up welding materials Nos. 13, 15, and 20 gave weld overlay metals that had a little weight loss on abrasion of about 3 g and were found to have excellent abrasion resistance. Weld overlay metals prepared according to the embodiment of the present invention (weld overlay metals prepared with the build-up welding materials Nos. 62 and 63) had a little weight loss on abrasion of about 3 to 4 g and were found to have abrasion resistance superior to that of the weld overlay metals prepared with the conventional build-up welding materials (weld overlay metals prepared with the build-up welding materials Nos. 1, 2, and 4).

The conventional build-up welding material No. 2 gave a weld overlay metal that had inferior abrasion resistance. This is probably because the welding material contained alloy elements in low contents as a whole and was thereby excessively soft. In contrast, of the conventional build-up welding materials, the build-up welding materials Nos. 1 and 4 gave weld overlay metals that had inferior abrasion resistance, probably because they have poor toughness (a low tensile strength) and became brittle to enhance aggressive abrasion.

Experimental Example 7

A simulation of welding was performed, and whether cracking occurred or not in a weld overlay layer after welding was determined so as to evaluate the welding workability of each build-up welding material. A S25C steel in the from of a sheet of 200 mm by 300 mm by 50 mm was prepared as a base metal. The base metal was subjected to overlay welding with each build-up welding material to form a weld overlay layer having an average thickness of about 3 mm. The welding was performed under the same conditions as in Experimental Example 1. Each sample (welded base metal) after the welding was subjected to annealing at 580° C. for 4 hours, and whether and how cracking occurred was observed by color check (dye penetrant inspection). The appearance of the weld overlay layer surface was visually observed. A sample not suffering from cracking was evaluated as good (○); a sample suffering from fine cracking was evaluated as fair "Δ"; and a sample suffering from coarse cracking was evaluated as poor (failure) "x". Table 6 indicates the welding workability evaluation results of the respective weld overlay metals.

TABLE 6

| | | Repairability evaluation | | | | |
|---|---|---|---|---|---|---|
| No. | Welding workability | First layer | Second layer | Third layer | Microstructure identification | Remarks |
| No. 1 | ○ | ○ | ○ | x | — | Conventional Example |
| No. 2 | ○ | ○ | ○ | ○ | — | Conventional Example |
| No. 3 | — | — | — | — | γ-Fe | Conventional Example |
| No. 4 | ○ | ○ | x | | γ-Fe | Conventional Example |
| No. 5 | — | — | — | — | M | Conventional Example |
| No. 6 | x | — | — | — | α-Fe, M, Fe$_3$C | Conventional Example |
| No. 11 | x | x | | | α-Fe, Cr$_7$C$_3$ | Conventional Example |
| No. 12 | x | x | | | α-Fe, Cr$_7$C$_3$ | Comparative Example |
| No. 13 | ○ | ○ | ○ | x | α-Fe, Cr$_7$C$_3$ | Comparative Example |
| No. 14 | ○ | ○ | ○ | ○ | α-Fe, Cr$_7$C$_3$ | Comparative Example |
| No. 15 | ○ | ○ | x | | α-Fe, Cr$_7$C$_3$ | Comparative Example |
| No. 17 | — | — | — | — | α-Fe, Cr$_7$C$_3$ | Comparative Example |
| No. 18 | — | — | — | — | α-Fe, Cr$_7$C$_3$ | Comparative Example |
| No. 19 | — | — | — | — | α-Fe, Cr$_7$C$_3$ | Comparative Example |
| No. 20 | Δ | — | — | — | — | Comparative Example |
| No. 32 | ○ | — | — | — | α-Fe, Cr$_{23}$C$_6$ | Comparative Example |
| No. 34 | ○ | — | — | — | α-Fe, Cr$_{23}$C$_6$ | Example |
| No. 35 | ○ | — | — | — | α-Fe, Cr$_{23}$C$_6$ | Example |

TABLE 6-continued

| | | Repairability evaluation | | | | |
|---|---|---|---|---|---|---|
| No. | Welding workability | First layer | Second layer | Third layer | Microstructure identification | Remarks |
| No. 36 | ○ | — | — | — | α-Fe, Cr$_{23}$C$_6$ | Example |
| No. 38 | x | — | — | — | — | Comparative Example |
| No. 39 | ○ | — | — | — | — | Example |
| No. 40 | x | — | — | — | — | Comparative Example |
| No. 41 | ○ | — | — | — | — | Comparative Example |
| No. 42 | ○ | — | — | — | — | Example |
| No. 43 | Δ | — | — | — | — | Comparative Example |
| No. 44 | ○ | — | — | — | — | Example |
| No. 45 | ○ | — | — | — | — | Comparative Example |
| No. 46 | Δ | — | — | — | — | Comparative Example |
| No. 47 | ○ | — | — | — | — | Example |
| No. 48 | ○ | — | — | — | — | Example |
| No. 49 | ○ | — | — | — | — | Example |
| No. 50 | ○ | — | — | — | — | Example |
| No. 51 | ○ | — | — | — | — | Example |
| No. 52 | ○ | — | — | — | — | Comparative Example |
| No. 53 | ○ | — | — | — | — | Comparative Example |
| No. 54 | ○ | — | — | — | — | Example |
| No. 55 | ○ | — | — | — | — | Comparative Example |
| No. 62 | ○ | ○ | ○ | ○ | α-Fe, Cr$_{23}$C$_6$ | Example |
| No. 63 | ○ | ○ | ○ | ○ | α-Fe, Cr$_7$C$_3$ | Example |
| No. 64 | x | x | x | x | α-Fe, Cr$_7$C$_3$ | Comparative Example |

As is indicated in Table 6, weld overlay metals prepared with some of the conventional build-up welding materials in Table 1 suffered from cracking. In contrast, weld overlay metals prepared according to the embodiment of the present invention (weld overlay metals prepared with the build-up welding materials Nos. 62 and 63) did not suffer from cracking in observation and were found to exhibit excellent welding workability.

Experimental Example 8

A simulation of repair welding was performed, and whether cracking occurred in a weld overlay layer after the repair welding was determined so as to evaluate the weld repairability of each build-up welding material.

A S25C steel in the form of a sheet of 200 mm by 300 mm by 50 mm was prepared as a base metal, and this was subjected to overlay welding with each build-up welding material to form a weld overlay layer (first layer) having an average thickness of about 3 mm. The welding was performed under the same conditions as in Experimental Example 1. Each sample (welded base metal) was subjected to annealing at 580° C. for 4 hours, and whether and how cracking occurred was observed by color check (dye penetrant inspection).

Build-up welding materials found to give no cracking in the evaluation were subjected to an evaluation as follows. A S25C steel in the form of a sheet of 200 mm by 300 mm by 50 mm was prepared as a base metal and this was subjected to overlay welding with each build-up welding material to form a weld overlay layer (first layer) having an average thickness of about 3 mm. A weld overlay layer (second layer) having an average thickness of about 3 mm was then formed on the weld overlay layer (first layer) by the same procedure as above. Each sample (welded base metal) was subjected to annealing at 580° C. for 4 hours, and whether and how cracking occurred was observed by color check (dye penetrant inspection).

Build-up welding materials where no cracking was observed in the evaluation were subjected to an evaluation as follows. A S25C steel in the form of a sheet of 200 mm by 300 mm by 50 mm was prepared as a base metal and this was subjected to overlay welding with each build-up welding material to form a weld overlay layer (first layer) having an average thickness of about 3 mm. Another weld overlay layer (second layer) having an average thickness of about 3 mm was then formed on the weld overlay layer (first layer) by the same procedure as above. Yet another weld overlay layer (third layer) having an average thickness of about 3 mm was then formed on the weld overlay layer (second layer) by the same procedure as above. Each sample (welded base metal) was subjected to annealing at 580° C. for 4 hours, and whether and how cracking occurred was observed by color check (dye penetrant inspection).

Table 6 indicates the weld repairability evaluation results of the respective weld overlay metals. In the evaluation, the outermost surface of the weld overlay layer was visually observed. A sample not suffering from cracking was evaluated as good "○"; whereas a sample suffering from cracking was evaluated as failure (poor) "x".

Weld overlay metals prepared with some of the conventional build-up welding materials in Table 1 suffered from cracking during the steps of overlaying weld overlay layers from the first layer to the third layer. In contrast, weld overlay metals prepared according to the embodiment of the present invention (weld overlay metals prepared with the build-up welding materials Nos. 62, and 63) did not have cracking in the observation, even upon overlaying of the weld overlay layers up to the third layer, and were found to exhibit excellent weld repairability.

Experimental Example 9

A hard chrome coated layer may be formed on a surface of build-up welding material after welding (on a surface of weld overlay layer) typically in a treatment chamber of treatment equipment such as pulverizer or tube reactor. This is performed so as to allow the treatment chamber to have further better abrasion resistance. In this case, the underlying weld overlay layer requires good adhesion with the overlying hard chrome coated layer. The adhesion between the weld overlay layer and the hard chrome coated layer was evaluated by a method as follows.

Figure 5:
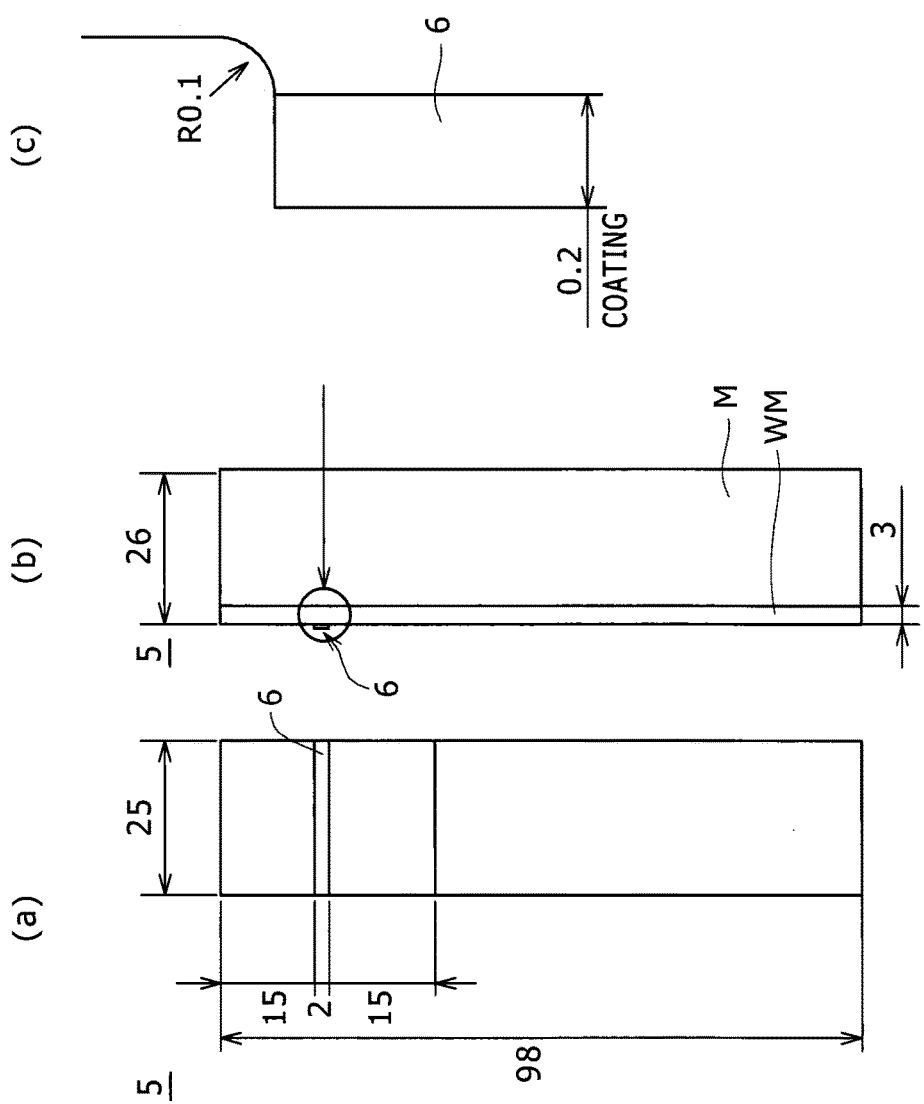
FIG. 5 is an explanatory drawing illustrating a plane shear test specimen used in Experimental Example 9.
Figure 6:
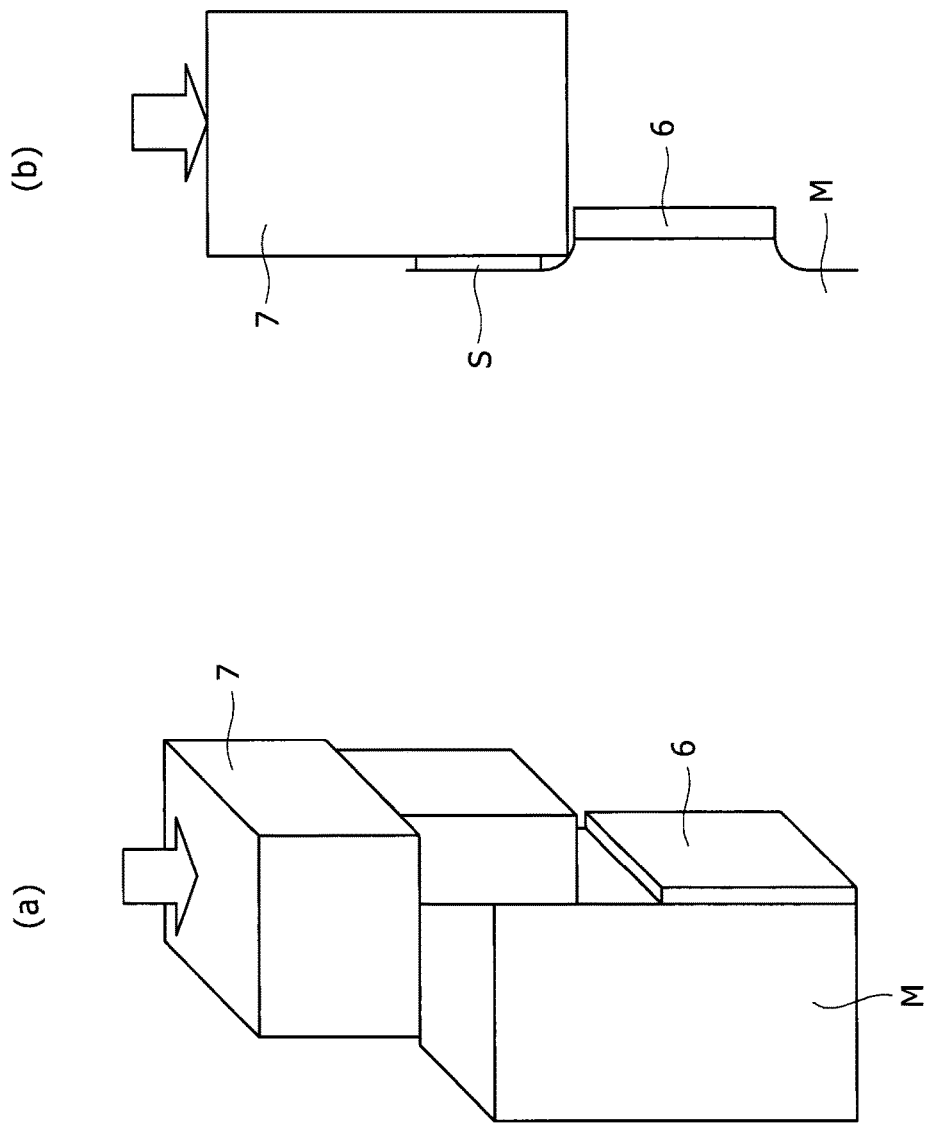
FIG. 6 of an explanatory drawing illustrating how to perform plane shear tests in Experimental Example 9.

A S25C steel in the form of a sheet of 200 mm by 300 mm by 50 mm was prepared as a base metal and this was subjected to overlay welding with each build-up welding material and yielded a weld overlay layer (first layer) having an average thickness of about 3 mm. The welding was performed under the same conditions as in Experimental Example 1. The sample (welded base metal) was subjected to annealing at 580° C. for 4 hours, and a hard chrome coated layer was formed thereon to a thickness of 200 μm by electroplating. A plating bath as an aqueous solution was prepared by mixing a chromic anhydride aqueous solution (concentration: 250 g/L) and a sulfuric acid aqueous solution (concentration: 2.5 g/L) in a ratio of 100:1. Using this, the electroplating of hard chrome coating was performed at a current density of 20 A and a distance between electrodes of 45 mm to form a hard chrome coated layer having the predetermined thickness. The base metal bearing the formed hard chrome coated layer was processed into a plane shear test specimen 5 as illustrated in FIG. 5. FIGS. 5(a), 5(b), and 5(c) are a front view, a side view, and a partially enlarged view of the side view of FIG. 5(b), respectively, of the plane shear test specimen 5. The reference sign WM stands for a weld overlay metal. The hard chrome coated layer 6 was formed into a strip having a width of 2 mm and a length of 25 mm, the remainder of which was fully removed. The prepared plane shear test specimen 5 was mounted onto a slow strain rate tester (tensile tester). A hook 7 attached to the tensile tester crosshead was forced from upside toward downside as illustrated in FIG. 6, and a load upon shear fracture was measured. FIGS. 6(a) and 6(b) are a perspective view and a partially enlarged view of the side, respectively, of the tensile tester. The adhesion between the weld overlay layer and the hard chrome coated layer was evaluated from the measured shear fracture load. The reference signs M and S stand for the base metal and a spacer, respectively. FIG. 7 illustrates the evaluation results on adhesion between the weld overlay metal and the hard chrome coating of respective samples.

The conventional build-up welding materials in Table 1 mostly gave weld overlay metals (weld overlay layers) that had poor adhesion with the hard chrome coating and had a low shear fracture load. Specifically, even the sample No. 2 having the highest shear fracture load among them had a low shear fracture load of 143.5 MPa. Of the other build-up welding materials, the sample No. 20 had a largest shear fracture load of 194.2 MPa at most. In contrast, weld overlay metals prepared according to the embodiment of the present invention (weld overlay metals prepared with the build-up welding materials Nos. 62, and 63) had high shear fracture loads of 217.1 MPa, and 253.1 MPa, respectively, and were found to have excellent adhesion with the hard chrome coating.

Experimental Example 10

Phases (microstructures) forming a polycrystalline microstructure in each weld overlay metal were identified by X-ray diffractometry (XRD) (X-ray micro-diffractometry). Table 6 indicates the identification results.

Weld overlay metals prepared with the build-up welding materials Nos. 3 and 4 in Table 1 were found to have a polycrystalline microstructure including a dendrite microstructure. The microstructure was found to include an austenite phase in a nearly overall region, because the γ-Fe phase (austenite phase) alone was detected in X-ray diffractometry (XRD). A weld overlay metal prepared with the build-up welding material No. 5 was found to have a microstructure including a martensite phase in a nearly overall region, because the M phase (martensite phase) alone was detected in XRD. A weld overlay metal prepared with the build-up welding material No. 6 was found to have a complicated polycrystalline microstructure including three phases, i.e., an α-Fe phase (ferrite phase), a martensite phase, and a $Fe_3C$ phase (cementite phase), because the three phases, i.e., ferrite phase, martensite phase, and cementite phase were detected in XRD. In contrast, weld overlay metals prepared with the build-up welding materials Nos. 11 to 19 were found to have a microstructure including two phases, i.e., an α-Fe phase (ferrite phase) and a $Cr_7C_3$ phase (intermetallic compound phase). Weld overlay metals prepared according to the embodiment of the present invention (weld overlay metals prepared with the build-up welding material No. 62) were found to include two phases, i.e., an α-Fe phase (ferrite phase) and a $Cr_{23}C_6$ phase (intermetallic compound phase). Weld overlay metals prepared according to the embodiment of the present invention (weld overlay metals prepared with the build-up welding materials Nos. 63 and 64) were found to include two phases, i.e., an α-Fe phase (ferrite phase) and a $Cr_7C_3$ phase (intermetallic compound phase).

Peak fitting was performed on diffraction peaks of the respective phases detected in XRD, and contents (relative contents) of the phases were calculated from peak intensities (peak areas). As a result, the weld overlay metal prepared with the build-up welding material No. 13 was found to have a ratio of the α-Fe phase to the $Cr_7C_3$ phase of 77.5:22.5. In contrast, the weld overlay metals prepared according to the embodiment of the present invention (weld overlay metals prepared with the build-up welding material No. 62) had ratios of the α-Fe phase to the $CrC_6$ phase of 96.6:3.4. The weld overlay metals prepared according to the embodiment of the present invention (weld overlay metals prepared with the build-up welding materials Nos. 63 and 64) had ratios of the α-Fe phase to the $Cr_7C_3$ phase of 77.5:22.5 and 70.8:29.2, respectively.

The results demonstrate that the weld overlay metals prepared according to the embodiment of the present invention (weld overlay metals prepared with the build-up welding materials Nos. 62 and 63) each roughly included a ferrite single phase. The ferrite microstructure more readily and stably occludes hydrogen than the austenite microstructure and martensite microstructure do. The ferrite microstructure therefore advantageously resists hydrogen embrittlement and cracking even in an acidic atmosphere (corrosive environment). Specifically, the ferrite microstructure advantageously contributes to resistance to hydrogen embrittlement in an acidic atmosphere (corrosive environment), because hydrogen is not accumulated locally in ferrite even if hydrogen is generated by corrosion and taken into the steel.

As is described above, the welding materials according to the embodiment of the present invention, when used in overlay welding, can give weld overlay metals that excel in add-corrosion resistance and abrasion resistance. The welding materials, when used in overlay welding, can therefore give treatment chambers (machinery parts) that excel in corrosion resistance and abrasion resistance.

The formed weld overlay layers excel in ductility and toughness. The formed weld overlay layers resist cracking after welding and exhibit excellent welding workability. The formed weld overlay layers also excel in cracking resistance and adhesion between the existing weld overlay layer and a new (overlying) weld overlay layer when the build-up welding materials are used in multi-layer overlay welding. The formed weld overlay layers exhibit excellent repairability.

In addition, the formed weld overlay layers have excellent cracking resistance and satisfactory adhesion with a hard chrome coating. A hard chrome coated layer can therefore be formed satisfactorily on a surface layer of the formed weld overlay layers.

INDUSTRIAL APPLICABILITY

The present invention is widely usable in the technical fields typically of build-up welding materials and machinery parts welded with weld overlay metals.

The invention claimed is:

1. A machinery part, comprising:
a base steel; and
a weld overlay metal welded on or over a surface of the base steel;
wherein the weld overlay metal comprises a surface layer, which comprises:
C in a content of 0.3 to 0.7 percent by mass;
Si in a content of 0.2 to 0.5 percent by mass;
Mn in a content of 0.5 to 2.0 percent by mass;
Cr in a content of 15 to 30 percent by mass;
Mo in a content of 0.2 to 6.0 percent by mass;
W in a content of 0.1 to 1.5 percent by mass;
V in a content of more than 0.5 to 2.0 percent by mass; and
balance Fe and inevitable impurities, and
wherein the weld overlay metal has a microstructure consisting of α-Fe phase and $Cr_{23}C_6$ phase or consisting of α-Fe phase and $Cr_7C_3$ phase.

2. The machinery part according to claim 1, wherein V is contained in a content of more than 0.5 to 1.5 percent by mass in the surface layer.

3. The machinery part according to claim 1, wherein C is contained in a content of 0.4 to 0.7 percent by mass in the surface layer.

4. The machinery part according to claim 1, wherein Mn is contained in a content of 0.7 to 1.2 percent by mass in the surface layer.

5. The machinery part according to claim 1, wherein Mo is contained in a content of 0.2 to 1.5 percent by mass in the surface layer.

6. The machinery part according to claim 1, wherein W is contained in a content of 0.2 to 1.0 percent by mass in the surface layer.

7. A machinery part, comprising:
a base steel; and
a weld overlay metal welded on or over a surface of the base steel;
wherein the weld overlay metal comprises a surface layer, which comprises:
C in a content of 0.3 to 0.7 percent by mass;
Si in a content of 0.2 to 0.5 percent by mass;
Mn in a content of 0.5 to 2.0 percent by mass;
Cr in a content of 15 to 30 percent by mass;
Mo in a content of 0.2 to 6.0 percent by mass;
W in a content of 0.1 to 1.5 percent by mass;
Ni in a content of more than 0.5 to 1.5 percent by mass; and
balance Fe and inevitable impurities, and
wherein the weld overlay metal has a microstructure consisting of α-Fe phase and $Cr_{23}C_6$ phase or consisting of α-Fe phase and $Cr_7C_3$ phase.

8. The machinery part according to claim 7, wherein C is contained in a content of 0.4 to 0.7 percent by mass in the surface layer.

9. The machinery part according to claim 7, wherein Mn is contained in a content of 0.7 to 1.2 percent by mass in the surface layer.

10. The machinery part according to claim 7, wherein Mo is contained in a content of 0.2 to 1.5 percent by mass in the surface layer.

11. The machinery part according to claim 7, wherein W is contained in a content of 0.2 to 1.0 percent by mass in the surface layer.

* * * * *